(12) United States Patent
Harvey

(10) Patent No.: US 11,371,467 B2
(45) Date of Patent: *Jun. 28, 2022

(54) CONCENTRIC TURBOMACHINE WITH ELECTRIC MACHINE

(71) Applicant: ROLLS-ROYCE plc, London (GB)

(72) Inventor: Giles E Harvey, Derby (GB)

(73) Assignee: ROLLS-ROYCE plc, London (GB)

( * ) Notice: Subject to any disclaimer, the term of this patent is extended or adjusted under 35 U.S.C. 154(b) by 335 days.

This patent is subject to a terminal disclaimer.

(21) Appl. No.: 16/528,201

(22) Filed: Jul. 31, 2019

(65) Prior Publication Data
US 2020/0102910 A1    Apr. 2, 2020

(30) Foreign Application Priority Data

Aug. 22, 2018 (GB) ...................................... 1813674

(51) Int. Cl.
*F02K 3/06* (2006.01)
*B64D 27/16* (2006.01)

(52) U.S. Cl.
CPC ................ *F02K 3/06* (2013.01); *B64D 27/16* (2013.01); *F05D 2220/323* (2013.01); *F05D 2220/36* (2013.01); *F05D 2250/311* (2013.01)

(58) Field of Classification Search
None
See application file for complete search history.

(56) References Cited

U.S. PATENT DOCUMENTS

| 2,270,615 A | 1/1942 | Baldwin | |
| 3,673,802 A * | 7/1972 | Krebs | F02C 3/067 60/226.1 |
| 3,867,813 A | 2/1975 | Leibach | |
| 6,148,605 A | 11/2000 | Lardellier | |
| 6,209,311 B1 | 4/2001 | Itoh et al. | |
| 8,100,630 B2 * | 1/2012 | Guemmer | F02C 3/064 415/65 |
| 10,443,620 B2 * | 10/2019 | Hoefler | F04D 29/5806 |

(Continued)

FOREIGN PATENT DOCUMENTS

| CN | 102001440 A | 4/2011 |
| CN | 107054597 A | 8/2017 |

(Continued)

OTHER PUBLICATIONS

Wendus et al., Follow-On Technology Requirement Study for Advanced Subsonic Transport, 2003, NASA, NASA/CR—2003-212467, p. 8 (Year: 2003) (Year: 2003) (Year: 2003).*

(Continued)

*Primary Examiner* — Jason H Duger
(74) *Attorney, Agent, or Firm* — Oliff PLC

(57) ABSTRACT

An axial flow turbomachine (102) for producing thrust to propel an aircraft is shown. The turbomachine has an inner duct (202) and an outer duct (204), both of which are annular and concentric with one another. An inner fan (206) is located in the inner duct, and is configured to produce a primary pressurised flow (P). An outer fan (207) is located in an outer duct, and is configured to produce a secondary pressurised flow (S). The outer fan has a hollow hub (208) through which the inner duct passes. The inner fan is configured to have, in operation, a tip speed of from 1 to 3 times that of the outer fan.

18 Claims, 2 Drawing Sheets

(56) References Cited

U.S. PATENT DOCUMENTS

| | | | |
|---|---|---|---|
| 2008/0120839 A1 | 5/2008 | Schilling | |
| 2009/0245998 A1 | 10/2009 | Guemmer | |
| 2011/0030336 A1 | 2/2011 | Kuehn et al. | |
| 2012/0107092 A1 | 5/2012 | Terao | |
| 2014/0030060 A1* | 1/2014 | Magowan | F02C 3/067 |
| | | | 415/60 |
| 2014/0367510 A1 | 12/2014 | Viala et al. | |
| 2017/0122257 A1 | 5/2017 | Sankrithi | |
| 2019/0017446 A1* | 1/2019 | Adams | F02K 3/06 |
| 2019/0257318 A1* | 8/2019 | Vanapalli | F01D 5/143 |

FOREIGN PATENT DOCUMENTS

| | | | | |
|---|---|---|---|---|
| EP | 2 101 040 | A2 | 9/2009 | |
| FR | 3 060 061 | A1 | 6/2018 | |
| GB | 978658 | A | 12/1964 | |
| GB | 1197711 | A | 7/1970 | |
| GB | 1321657 | A | 6/1973 | |
| GB | 2 189 844 | A | 11/1987 | |
| GB | 2541932 | A * | 3/2017 | F01D 15/10 |
| GB | 2541932 | A | 3/2017 | |
| WO | 2018/063019 | A1 | 4/2018 | |

OTHER PUBLICATIONS

Waters et al., "Analysis of Turbofan Propulsion System Weight and Dimensions" (1977), NASA TM X-73, 199 (Year: 1977) (Year: 1977).*

U.S. Appl. No. 16/527,905, filed Jul. 31, 2019 in the name Harvey.
U.S. Appl. No. 16/528,034, filed Jul. 31, 2019 in the name Harvey.
U.S. Appl. No. 16/528,114, filed Jul. 31, 2019 in the name Harvey.
U.S. Appl. No. 16/528,243, filed Jul. 31, 2019 in the name Harvey.

Feb. 21, 2019 Search Report issued in Great Britain Patent Application No. 1813670.5.
Feb. 18, 2019 Search Report issued in Great Britain Patent Application No. 1813671.3.
Feb. 21, 2019 Search Report issued in Great Britain Patent Application No. 1813672.1.
Feb. 12, 2019 Search Report issued in Great Britain Patent Application No. 1813674.7.
Feb. 15, 2019 Search Report issued in Great Britain Patent Application No. 1813675.4.
Jan. 30, 2020 Extended European Search Report issued in European Patent Application No. 19188388.3.
Feb. 19, 2020 Extended European Search Report issued in European Patent Application No. 19188390.9.
Feb. 19, 2020 Extended European Search Report issued in European Patent Application No. 19188395.8.
Feb. 19, 2020 Extended European Search Report issued in European Patent Application No. 19188389.1.
Feb. 7, 2020 European Search Report issued in European Patent Application No. 19188392.
Sep. 16, 2021, Non Final Office Action issued in U.S. Appl. No. 16/528,034.
Sep. 21, 2021, Non Final Office Action Issued in U.S. Appl. No. 16/527,905.
Sep. 21, 2021, Non-Final Office Action Issued in U.S. Appl. No. 16/528,114.
Sep. 21, 2021, Non-Final Office Action issued in U.S. Appl. No. 16/528,243.
Feb. 28, 2022 Notice of Allowance Issued in U.S. Appl. No. 16/528,114.
Feb. 15, 2022 Office Action issued in U.S. Appl. No. 16/528,243.*
Feb. 18, 2022 Notice of Allowance issued in U.S. Appl. No. 16/527,905.

* cited by examiner

CONCENTRIC TURBOMACHINE WITH ELECTRIC MACHINE

TECHNICAL FIELD

This disclosure relates to turbomachinery for producing thrust to propel an aircraft.

BACKGROUND

Turbomachines transfer energy between a rotor and a fluid. They may be used for aircraft propulsion by developing thrust. The range and cost of operating an aircraft is largely dependent upon the efficiency of its engines. As energy sources become more scarce, it is desirable to increase the propulsive efficiency of the propulsive turbomachinery. It is also desirable to employ electric machines to drive the turbomachines to reduce the thermal losses and emissions associated with internal combustion engines.

SUMMARY

The invention is directed towards axial flow turbomachines for producing thrust to propel an aircraft, and aircraft incorporating the same.

In an aspect, such an axial flow turbomachine comprises an inner duct and an outer duct, both of which are annular and concentric with one another.

The turbomachine further comprises an inner fan located in the inner duct, the inner fan being configured to produce a primary pressurised flow, and an outer fan located in the outer duct, the outer fan being configured to produce a secondary pressurised flow and having a hollow hub through which the inner duct passes.

The inner fan is configured to have, in operation, a tip speed of from 1 to 3 times that of the outer fan.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
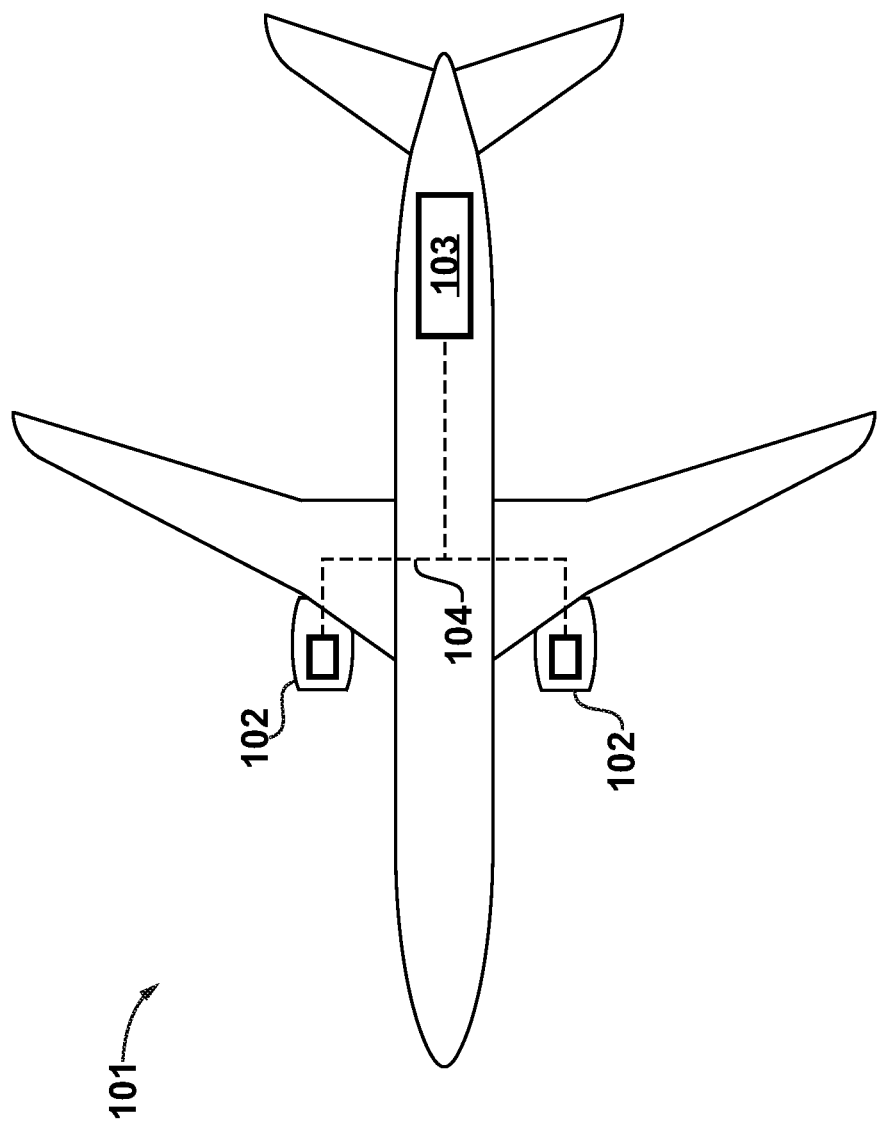
FIG. 1 shows an aircraft having axial flow turbomachines for producing thrust.

An aircraft 101 is illustrated in FIG. 1, and is in the present embodiment a hybrid electric aircraft having two axial flow turbomachines 102 that are electrically-driven. The turbomachines 102 will be described further with reference to FIG. 2.

Referring again to FIG. 1, electrical power is provided to the turbomachines by an electrical generation unit 103 located in the fuselage via a bus 104. It will be appreciated by those skilled in the art that the bus 104 may include conductors, power electronics, and may possibly include energy storage systems such as batteries or flywheels to provide extra capacity.

In the present embodiment, the electrical generation unit 103 includes an electric machine 201 which is driven by an internal combustion engine. In the present example, electrical generation unit 103 is configured as a turboelectric generator, in which the internal combustion engine is a gas turbine engine 202, i.e. a Brayton cycle engine. Alternatively, the internal combustion engine could be a piston engine, such as a Diesel cycle engine, or any other type of internal combustion engine, such as those operating in accordance with an Otto or Atkinson cycle.

In an alternative configuration, the aircraft 101 does not include an electrical generation unit 103, but instead includes a battery pack and is hence fully electric.

Figure 2:
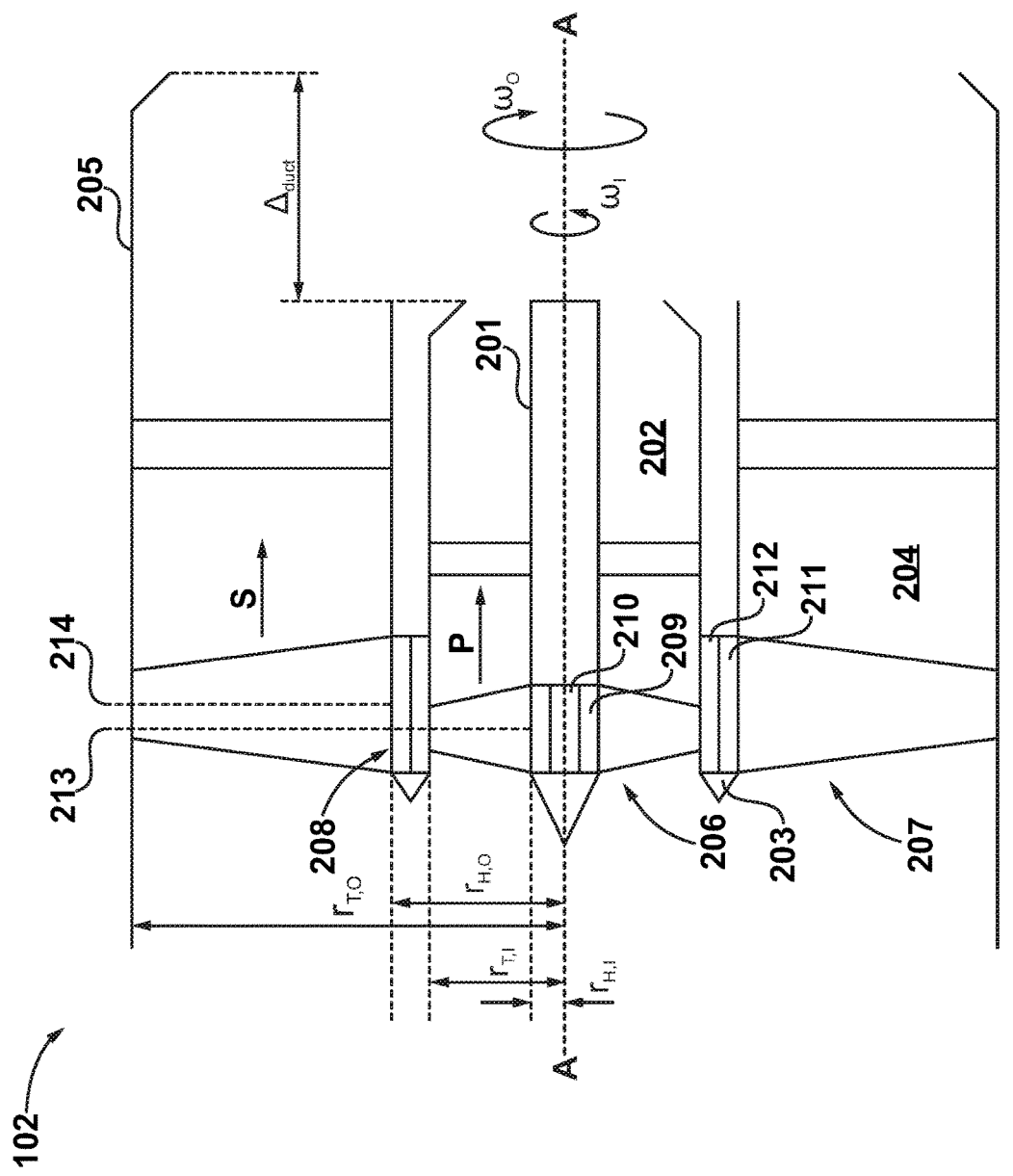
FIG. 2 is a schematic of one of the turbomachines of FIG. 1.

A schematic of one of the turbomachines 102 is illustrated in FIG. 2.

The turbomachine 102 is substantially axisymmetric around its centreline A-A. An inner casing 201 defines the inner radial extent of an inner duct 202, with a flow splitter 203 defining the outer radial extent of the inner duct 202. The flow splitter 203 also defines the inner radial extent of an outer duct 204, with an outer casing 205 defining the outer radial extent of the outer duct 204.

The inner duct 202 and outer duct 204 are thereby annular and concentric with each other with respect to the centreline A-A.

An inner fan 206 is located within the inner duct 202, whilst an outer fan 207 is located within the outer duct 204. In operation, each fan rotates around the centreline A-A. The inner fan 206 produces a primary pressurised flow P, and the outer fan 207 produces a secondary pressurised flow S. Together, the flows P and S produce thrust which propels the aircraft 101. In operation, the primary pressurised flow P and the secondary pressurised flow S exit their respective ducts 202 and 204, whereupon the secondary pressurised flow S substantially shrouds the primary pressurised flow P and reduces the appreciable jet noise of the primary pressurised flow P. This has particular benefits for vehicles which operate in areas where community noise is of concern.

As illustrated in the Figure, the outer fan 207 has a hollow hub 208 through which the inner duct 202 passes.

In the present embodiment, the outer duct 204 has a greater axial extent than the inner duct 202, such that its trailing edge is located axially downstream of the trailing edge of the inner duct 202. In this way, a mixing zone is created. The difference in duct length $\Delta_{duct}$, may be adjusted to achieve the desired level of mixing between the primary pressurised flow P and the secondary pressurised flow S.

In an embodiment, $\Delta_{duct}$ may be from 0 to 14 times the tip radius $r_{T,I}$ of the inner fan 206, i.e. $0 < \Delta_{duct} \leq 14 r_{T,I}$. In a specific embodiment, $4r_{T,I} < \Delta_{duct} \leq 10 r_{T,I}$. In another specific embodiment, $6r_{T,I} < \Delta_{duct} \leq 8 r_{T,I}$. In a another specific embodiment, $\Delta_{duct} = 7 r_{T,I}$.

$\Delta_{duct}$ may be selected to balance the degree of mixing achieved and the losses due to friction. For a given degree of mixing, a shorter $\Delta_{duct}$ may be achieved by using forced mixing techniques, such as by means of a lobed mixer. Thus for example in such a configuration $\Delta_{duct}$ may be less than 7 times the tip radius $r_{T,I}$ of the inner fan 206, i.e. $0 < \Delta_{duct} \leq 7 r_{T,I}$. In a specific embodiment, $2r_{T,I} < \Delta_{duct} \leq 5 r_{T,I}$. In another specific embodiment, $3r_{T,I} < \Delta_{duct} \leq 4 r_{T,I}$. In another specific embodiment, $\Delta_{duct} = 3.5 r_{T,I}$.

The inventor has discovered that the principle of operation of the turbomachine 102 in this embodiment is therefore similar to that of an ejector. In operation, shear forces between the primary pressurised flow P and secondary pressurised flow S drive a mixing process and a static pressure drop below ambient pressure in the mixing plane.

In a specific embodiment, the inner fan 206 rotates in a direction counter to the direction of rotation of the outer fan 207, i.e. $\hat{\omega}_I = -\hat{\omega}_O$. This may assist the mixing of the primary pressurised flow P and the secondary pressurised flow S.

During the mixing process, energy is transferred between the flows and the kinetic energy of the primary pressurised flow P is distributed over a larger mass flow of air. The specific enthalpies of the two flows P and S equalize and the exhaust velocity decreases. This increases the propulsive efficiency of the turbomachine 102.

In an alternative configuration the inner duct 202 is may be the same length or longer than the outer duct 204, i.e. $\Delta_{duct} \leq 0$ and so there is no mixing zone. However, the turbomachine 102 when configured in this way will still exhibit greater thrust than a single fan arrangement having the same pressure ratio and tip speed as the outer fan 207. This is attributable to the greater overall momentum change due to the presence of the inner fan 206.

The outer fan 207 has a swept area $A_O$ of from 2 to 20 times greater than the swept area $A_I$ of the inner fan 206, i.e. $2A_I \leq A_O \leq 20A_I$. The inventor has discovered that this provides a positive thrust gain, i.e. an augmentation factor $\Phi$ (which is a measure of the factor of thrust gain achieved versus a single rotor) is greater than 1. In a specific embodiment, the outer fan 207 has a swept area $A_O$ of from 4 to 17 times greater than the swept area $A_I$ of the inner fan 206, i.e. $4A_I \leq A_O \leq 17A_I$. The inventor has determined that this achieves an augmentation factor $\Phi$ of from about 1.15 to about 1.45 versus a single fan of the same tip diameter as the outer fan 207. In a specific embodiment, the outer fan 207 has a swept area $A_O$ of from 7.5 to 13 greater than the swept area $A_I$ of the inner fan 206, i.e. $7.5 A_I \leq A_O \leq 13A_I$. The inventor has determined that this achieves an augmentation factor $\Phi$ of from about 1.3 to about 1.4 versus a single fan of the same tip diameter as the outer fan 207. In a specific embodiment, the outer fan 207 has a swept area $A_O$ that is 9 times greater than the swept area $A_I$ of the inner fan 206, i.e. $A_O = 9 A_I$. The inventor has determined that this achieves an augmentation factor $\Phi$ of about 1.35 versus a single fan of the same tip diameter as the outer fan 207.

In the present embodiment, the inner fan 206 is driven by an electric machine comprising a rotor 209 and a stator 210. In the specific embodiment of FIG. 2, the rotor 209 and stator 210 are located within the casing 201. In the specific embodiment, the rotor 209 is an exterior rotor, such that the stator 209 is located radially inward relative to the rotor 210. It may be integral with the hub of the inner fan 206.

In an alternative embodiment, the rotor 209 may be an interior rotor, connected to the hub of the inner fan 206 by an appropriate shaft arrangement. In another alternative embodiment, the inner fan 206 may be rim-driven, with the rotor 209 and stator 210 located in the flow splitter 203. In such a case, the rotor 209 may be an interior rotor.

In the present embodiment, the outer fan 207 is driven by an electric machine comprising a rotor 211 and a stator 212. In the specific embodiment of FIG. 2, the rotor 211 and stator 212 are located within the flow splitter 203. In the specific embodiment, the rotor 211 is an exterior rotor, such that the stator 212 is located radially inward relative to the rotor 211 and radially outward of the inner duct 202. It may be integral with the hub of the outer fan 207.

In an alternative embodiment, the rotor 211 may be an interior rotor, connected to the hub of the outer fan 207 by an appropriate shaft arrangement. In another alternative embodiment, the fan 206 may be rim-driven, with the rotor 211 and stator 212 located in the casing 205. In such a case, the rotor 211 may be an interior rotor.

In the present embodiment, the inner fan 206 and outer fan 207 overlap in an axial sense. However, in alternative embodiments, they may instead only partially overlap, or alternatively not at all. In the present embodiment, the inner fan 206 has a mid-chord line 213 axially forward of the mid-chord line 214 of the outer fan 207. Alternatively, the mid-chord lines may be aligned axially, or instead the mid-chord line 213 may be located rearward of the mid-chord line 214.

The hub-tip ratio of the outer fan 207 $v_O$ may be determined as the ratio of the tip radius $r_{T,O}$ to the hub radius $r_{H,O}$. The hub-tip ratio of the inner fan 206 $v_I$ may be determined as the ratio of the tip radius $r_{T,I}$ to the hub radius $r_{H,I}$. The hub-tip ratios may be determined based on the mean hub and tip radii, should the hade angle at the root of the fans be non-zero, and/or the tip conform to a divergent or convergent duct endwall.

In an embodiment, the outer fan 207 has a hub-tip ratio $v_O$ of from 1.6 to 2.2 times that of the inner fan 206, $v_I$, i.e. $1.6 v_I \leq v_O \leq 2.2 v_I$. The inventor has discovered that this minimises the overall impact of tip clearance on the smaller-diameter inner fan 206. Further, the inner fan 206 may rotate at a rate greater than the rate of the outer fan 207, i.e. $|\omega_I| > |\omega_O|$, due to the reduced blade stresses. In a specific embodiment, the outer fan 207 has a hub-tip ratio $v_O$ of from 1.6 to 2.0 times that of the inner fan 206, $v_I$, i.e. $1.6 v_O \leq v_O \leq 2.0 v_I$. In another specific embodiment, the outer fan 207 has a hub-tip ratio $v_O$ of from 1.6 to 1.8 times that of the inner fan 206, $v_I$, i.e. $1.6 v_I \leq v_O \leq 1.8 v_I$. In another specific embodiment, the outer fan 207 has a hub-tip ratio $v_O$ that is 1.6 times that of the inner fan 206, $v_I$, i.e. $v_O = 1.6 v_I$. For example, the outer fan 207 may have a hub-tip ratio $v_O$ of 0.4, and the inner fan 206 has a hub-tip ratio $v_I$ of 0.25.

In an embodiment, the diameter of the outer fan 207 is from 2.5 to 3.5 times greater than the diameter of the inner fan 206. As will be appreciated this means that the respective radii $r_{T,O}$ and $r_{T,I}$ observe the same relation, i.e. $2.5 r_{T,I} \leq r_{T,O} \leq 3.5 r_{T,I}$. The inventor has discovered that this allows sufficient swept area for the outer fan 207 to operate efficiently, but enough space for the electric machine to be housed in the flow splitter. In a specific embodiment, the diameter of the outer fan 207 is from 2.8 to 3.3 times greater than the diameter of the inner fan 206, i.e. $2.8 r_{T,I} \leq r_{T,O} \leq 3.3 r_{T,I}$. In another specific embodiment, the diameter of the outer fan 207 is 3.2 times greater than the diameter of the inner fan 206, i.e. $r_{T,O} = 3.2 r_{T,I}$. The inventor has discovered that this allows for an optimum balance to be struck between the size of the electric machine, and the efficiency of the turbomachine. Further, in the present embodiment in which $\Delta_{duct}$ is positive, the aforementioned choices of diameters may also optimise the thrust augmentation factor $\Phi$ that is obtained.

In an embodiment, the inner fan 206 is configured to operate with a tip speed $U_{T,I}$ that is from 1 to 3 times the tip speed $U_{T,O}$ of the outer fan 207, i.e. $U_{T,O} \leq U_{T,I} \leq 3 U_{T,O}$. The inventor has discovered that this allows the inner fan 206 to operate with a higher pressure ratio whilst, due to the shielding provided by the secondary pressurised flow, not causing excessive jet noise. In a specific embodiment, the inner fan 206 is configured to operate with a tip speed $U_{T,I}$ that is from 1.3 to 2.5 times the tip speed $U_{T,O}$ of the outer fan 207, i.e. $1.3 U_{T,O} \leq U_{T,I} \leq 2.5 U_{T,O}$. In another specific embodiment, is configured to operate with a tip speed that is 1.9 times that of the outer fan 207, i.e. $U_{T,I} = 1.9 U_{T,O}$.

In an embodiment, the inner fan 206 is configured to operate at a rate of rotation $\omega_I$ that is from 3 to 8 times the rate $\omega_O$ of the outer fan 207, i.e. $3\omega_O \leq \omega_I \leq 8\omega_O$. The inventor has discovered that this maximises the work of the inner fan 206 whilst minimising tip losses and blade stress. In a specific embodiment, the inner fan 206 is configured to operate at a rate of rotation $\omega_I$ that is from 5 to 7 times the rate $\omega_O$ of the outer fan 207, i.e. $5\omega_O \leq \omega_I \leq 7\omega_O$. In another specific embodiment, the inner fan 206 is configured to operate at a rate of rotation 6 times that of the outer fan 207, i.e. $\omega_I=6\omega_O$.

It will be appreciated by those skilled in the art that whilst the present embodiments of the turbomachine 102 have been described with application to a hybrid- or fully-electric aircraft, the same principles may be applied in embodiments in which the requisite shaft power is provided by another means, such as one or more gas turbine engines. Different rotational rates may, for example, be achieved by use of a gearbox. Alternatively, a combination of a gas turbine and an electric machine may be used to drive one or more of the inner and outer fans.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An axial flow turbomachine for producing thrust to propel an aircraft, comprising:
    an inner duct and an outer duct, both of which are annular and concentric with one another;
    an inner fan located in the inner duct driven by a first electric machine, the inner fan being configured to produce a primary pressurised flow, the primary pressurised flow producing thrust to propel the aircraft without the primary pressurised flow passing over any rotating blades downstream of the inner fan; and
    an outer fan located in the outer duct driven by a second electric machine, the outer fan being configured to produce a secondary pressurised flow and having a hollow hub through which the inner duct passes;
    wherein the inner fan is configured to have, in operation, an inner fan tip speed of from to 3 times that of an outer fan tip speed.

2. The turbomachine of claim 1, wherein the inner fan tip speed is from 1.3 to 2.5 times the outer fan tip speed.

3. The turbomachine of claim 1, wherein the inner fan tip speed is 1.9 times the outer fan tip speed.

4. The turbomachine of claim 1, wherein, in operation, the primary pressurised flow exits the inner duct and the secondary pressurised flow exits the outer duct, whereupon the secondary pressurised flow substantially shrouds the primary pressurised flow.

5. The turbomachine of claim 1, wherein the inner fan is configured to rotate at a rate greater than the outer fan.

6. The turbomachine of claim 1, the first electric machine having a rotor integral with a hub of the inner fan and a stator located radially inward of the rotor.

7. The turbomachine of claim 1, the second electric machine having a rotor integral with the hub of the outer fan and a stator located radially inward of the rotor and radially outward of the inner duct.

8. The turbomachine of claim 1, wherein the inner fan and the outer fan partially or fully overlap in an axial direction.

9. The turbomachine of claim 1, wherein a trailing edge of the outer duct is located axially downstream of the inner duct for mixing of the first and secondary pressurised flows.

10. The turbomachine of claim 1, wherein a hub-tip ratio of the outer fan is from 1.6 to 2.2 times a hub-tip ratio of the inner fan.

11. The turbomachine of claim 1, wherein a hub-tip ratio of the outer fan is from 1.6 to 1.8 times a hub-tip ratio of the inner fan.

12. The turbomachine of claim 1, wherein the outer fan has a diameter of from 2.5 to 3.5 times a diameter of the inner fan.

13. The turbomachine of claim 1, wherein the outer fan has a diameter of from 2.8 to 3.3 times a diameter of the inner fan.

14. The turbomachine of claim 1, wherein a swept area of the outer fan is from 2 to 20 times greater than a swept area of the inner fan.

15. The turbomachine of claim 1, wherein a swept area of the outer fan is from 7.5 to 13 times greater than a swept area of the inner fan.

16. The turbomachine of claim 1, wherein the inner fan is configured to have, in operation, a rate of rotation of from 3 to 8 times that of the outer fan.

17. The turbomachine of claim 1, wherein the inner fan is configured to have, in operation, a rate of rotation of from 5 to 7 times that of the outer fan.

18. An aircraft comprising one or more turbomachine according to claim 1.

* * * * *